(12) United States Patent
Yamada

(10) Patent No.: US 12,480,463 B2
(45) Date of Patent: Nov. 25, 2025

(54) REACTOR

(71) Applicant: Honda Motor Co., Ltd., Tokyo (JP)

(72) Inventor: Yoshikazu Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 207 days.

(21) Appl. No.: 18/519,310

(22) Filed: Nov. 27, 2023

(65) Prior Publication Data

US 2024/0183327 A1 Jun. 6, 2024

(30) Foreign Application Priority Data

Dec. 2, 2022 (JP) .................................. 2022-193767

(51) Int. Cl.
F02M 27/02 (2006.01)
(52) U.S. Cl.
CPC .................................. F02M 27/02 (2013.01)
(58) Field of Classification Search
CPC ..... F02M 27/02; F02M 26/36; F02M 21/0227
See application file for complete search history.

(56) References Cited

U.S. PATENT DOCUMENTS

2006/0194085 A1* 8/2006 Son ..................... H01M 8/0631
429/441
2015/0191352 A1* 7/2015 Chen ................... H01M 8/0618
252/373

FOREIGN PATENT DOCUMENTS

JP 2022112890 A 8/2022

* cited by examiner

*Primary Examiner* — Jacob M Amick
(74) *Attorney, Agent, or Firm* — Duft & Bornsen, PC

(57) ABSTRACT

A reactor includes: a first flow passage through which liquid and gas that reacts with the liquid flow; and a second flow passage provided adjacent to the first flow passage and through which a heat medium flows. Each of the first flow passage and the second flow passage is formed in a belt shape so as to extend in a length direction and a width direction orthogonal to the length direction, and is formed in a helical shape or a spiral shape around a vertical axis parallel to the width direction. The liquid is supplied to the first flow passage so as to flow in the length direction. The gas is supplied to the first flow passage so as to flow in the width direction.

7 Claims, 10 Drawing Sheets

FIG. 11

|  | DOUBLE-PIPE SET | PIPE-SET | MULTI-PIPE | HELICAL/ SPIRAL |
|---|---|---|---|---|
| FUEL FLOW PASSAGE CROSS-SECTIONAL AREA | MIDDLE | MIDDLE | LARGE | SMALL |
| FUEL FLOW PASSAGE SURFACE AREA | MIDDLE | LARGE | MIDDLE | LARGE |
| FUEL FLOW PASSAGE LENGTH | SHORT | MIDDLE | SHORT | LONG |
| REACTOR SIZE | LARGE | MIDDLE | SMALL | SMALL |

REACTOR

CROSS-REFERENCE TO RELATED APPLICATION

This application is based upon and claims the benefit of priority from Japanese Patent Application No. 2022-193767 filed on Dec. 2, 2022, the content of which is incorporated herein by reference.

BACKGROUND OF THE INVENTION

Field of the Invention

This invention relates to a reactor.

Description of the Related Art

In the related art, there has been known a reactor in which fuel and air flow to reform the fuel by an oxidation reaction (for example, see JP 2022-112890 A). The reactor described in JP 2022-112890 A is configured as a double-pipe reactor having a reaction field between an outer pipe member and an inner pipe member, which are provided coaxially, and generates reformed fuel by causing a heat medium to flow through the inner peripheral side of the inner pipe member and causing an air-fuel mixture to flow through the reaction field to cause an oxidation reaction to proceed.

In this type of reactor, it is necessary to increase the volume of the reaction field in order to increase the generation amount of the reformed fuel. However, in the double-pipe reactor described in JP 2022-112890 A, in order to increase the volume of the reaction field, the total length becomes longer proportionally, and it is difficult to efficiently increase the volume of the reaction field.

SUMMARY OF THE INVENTION

An aspect of the present invention is a reactor, including: a first flow passage through which liquid and gas that reacts with the liquid flow; and a second flow passage provided adjacent to the first flow passage and through which a heat medium flows. Each of the first flow passage and the second flow passage is formed in a belt shape so as to extend in a length direction and a width direction orthogonal to the length direction, and is formed in a helical shape or a spiral shape around a vertical axis parallel to the width direction. The liquid is supplied to the first flow passage so as to flow in the length direction. The gas is supplied to the first flow passage so as to flow in the width direction.

BRIEF DESCRIPTION OF THE DRAWINGS

The objects, features, and advantages of the present invention will become clearer from the following description of embodiments in relation to the attached drawings, in which:

FIG. 11 is a diagram for describing a comparison result of the structure of the reactor.

DETAILED DESCRIPTION OF THE INVENTION

An embodiment of the present invention will be described below with reference to FIGS. 1 to 11. The reactor according to the embodiment of the present invention is a flow reactor in which a liquid and gas are reacted under an elevated temperature. Hereinafter, in particular, a reforming reactor that is applied to a compression ignition engine mounted to a vehicle and reforms fuel supplied from a fuel tank to the engine by reacting the fuel with oxygen in air will be described.

The average global temperature is maintained in a warm state suitable for living things by greenhouse gases in the atmosphere. Specifically, part of the heat radiated from the ground surface heated by sunlight to outer space is absorbed by greenhouse gases and re-radiated to the ground surface, and thus the atmosphere is maintained in a warm state. Increasing concentrations of greenhouse gases in the atmosphere cause an increase in average global temperature (global warming). Carbon dioxide is a greenhouse gas that greatly contributes to global warming, and its concentration in the atmosphere depends on the balance between carbon fixed on or in the ground in the form of plants or fossil fuels and carbon present in the atmosphere in the form of carbon dioxide. For example, the carbon dioxide in the atmosphere is absorbed through photosynthesis in the growth process of plants, causing a decrease in carbon dioxide concentration in the atmosphere. The carbon dioxide is also released into the atmosphere through combustion of the fossil fuels, causing an increase in the carbon dioxide concentration in the atmosphere. In order to mitigate global warming, it is necessary to reduce carbon emissions by replacing the fossil fuels with a renewable energy source such as sunlight or wind power, or renewable fuel derived from biomass.

As such renewable fuel, low-octane gasoline obtained by Fischer-Tropsch (FT) synthesis is becoming widespread. The low-octane gasoline has high ignitability and can be applied to the compression ignition engine. However, the low octane gasoline is still in the stage of becoming widespread and is not yet sold in some areas. On the other hand, regular octane gasoline for a spark ignition engine, which is currently widespread, has low ignitability, and cannot be applied to the compression ignition engine as it is.

By placing the reforming reactor in a fuel supply path from the fuel tank to an injector of the engine and reforming the fuel as necessary, both the low-octane gasoline and the regular octane gasoline can be compression-ignited in a single engine. Therefore, in the present embodiment, the reactor is configured as below such that mountability to the vehicle can be improved by efficiently increasing the volume of the reaction field.

Figure 1:
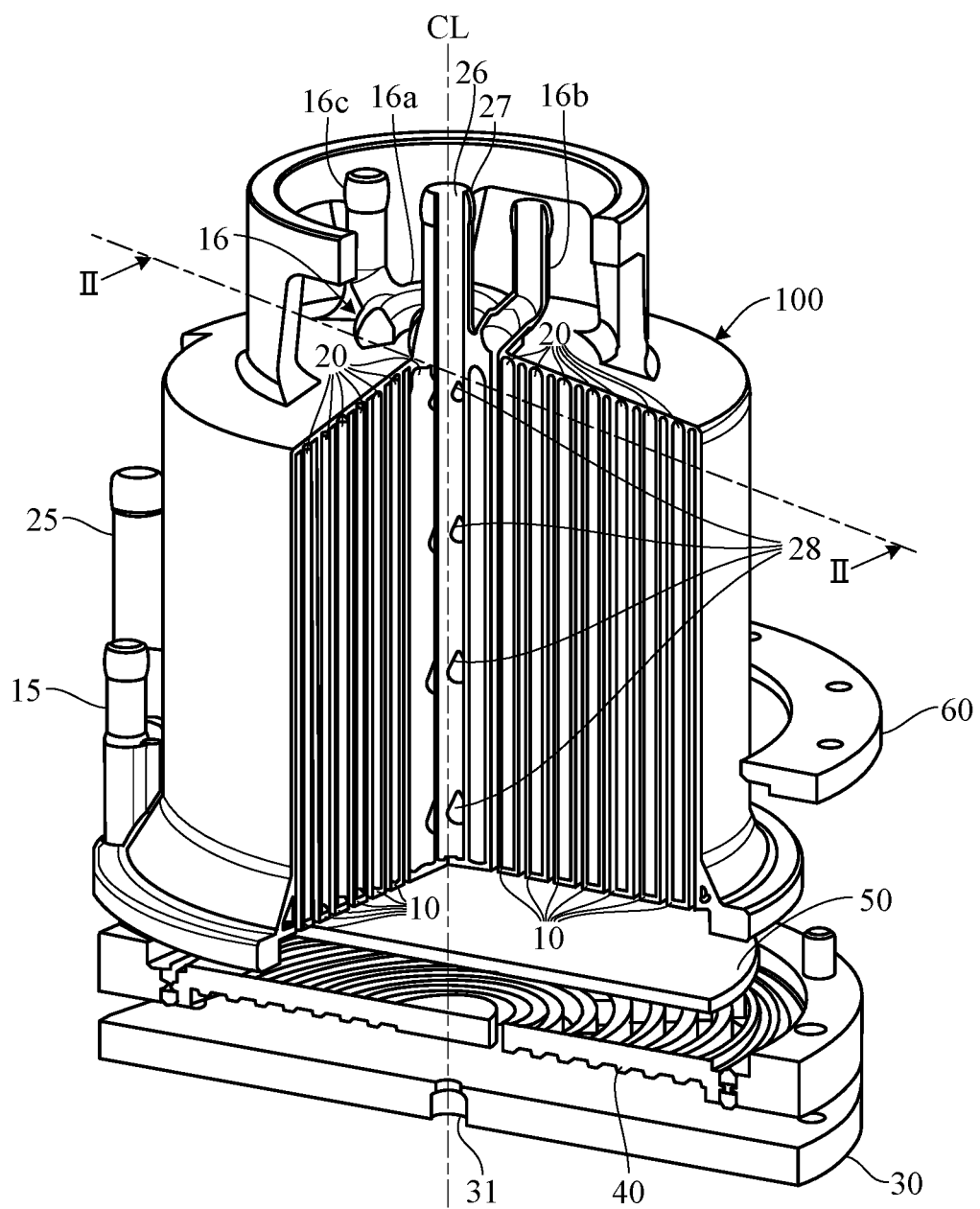
FIG. 1 is an assembled perspective view illustrating a reactor according to an embodiment of the present invention, which is partially cut out.
Figure 2:
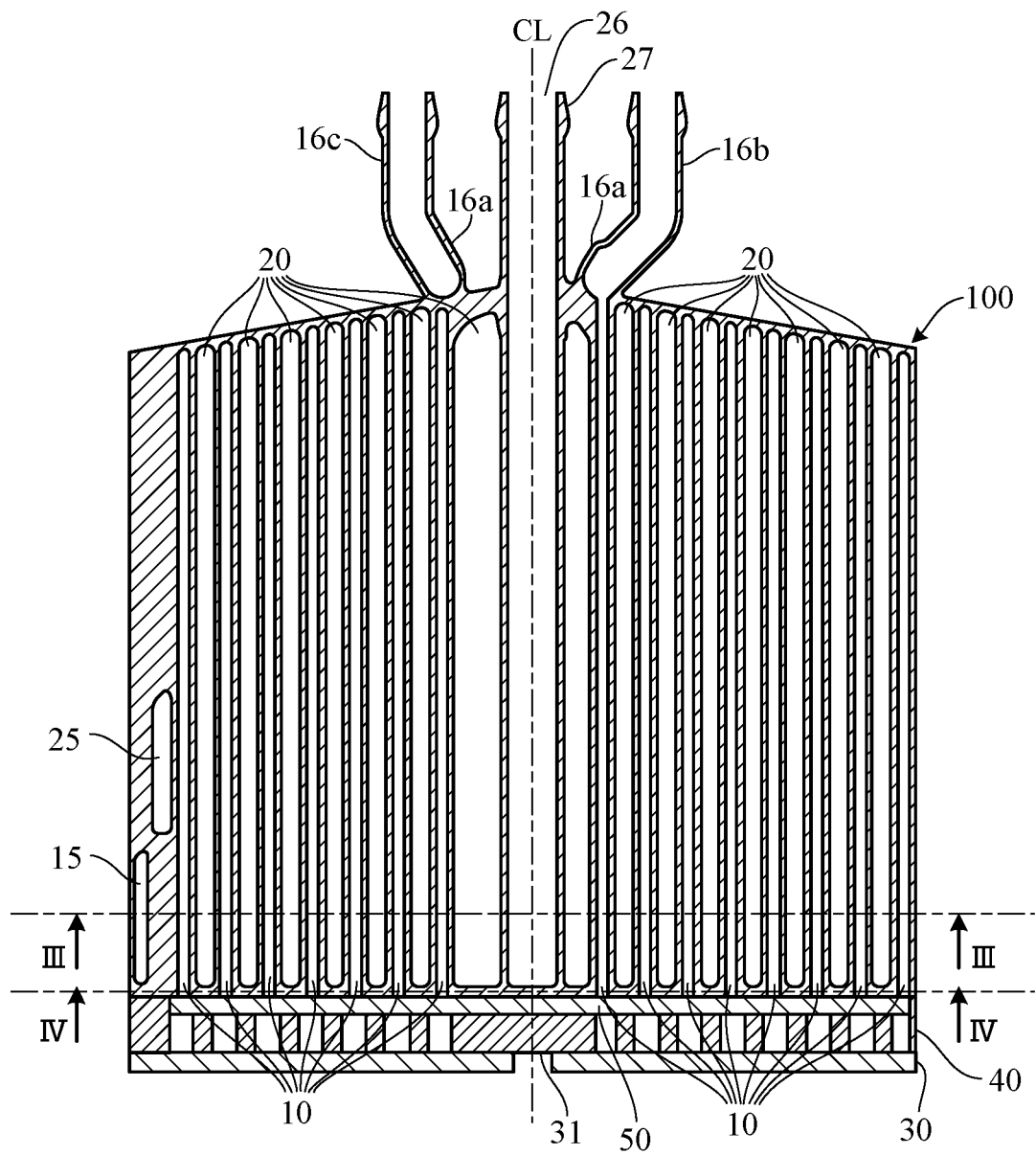
FIG. 2 is a cross-sectional view taken along line II-II of FIG. 1.
Figure 3:
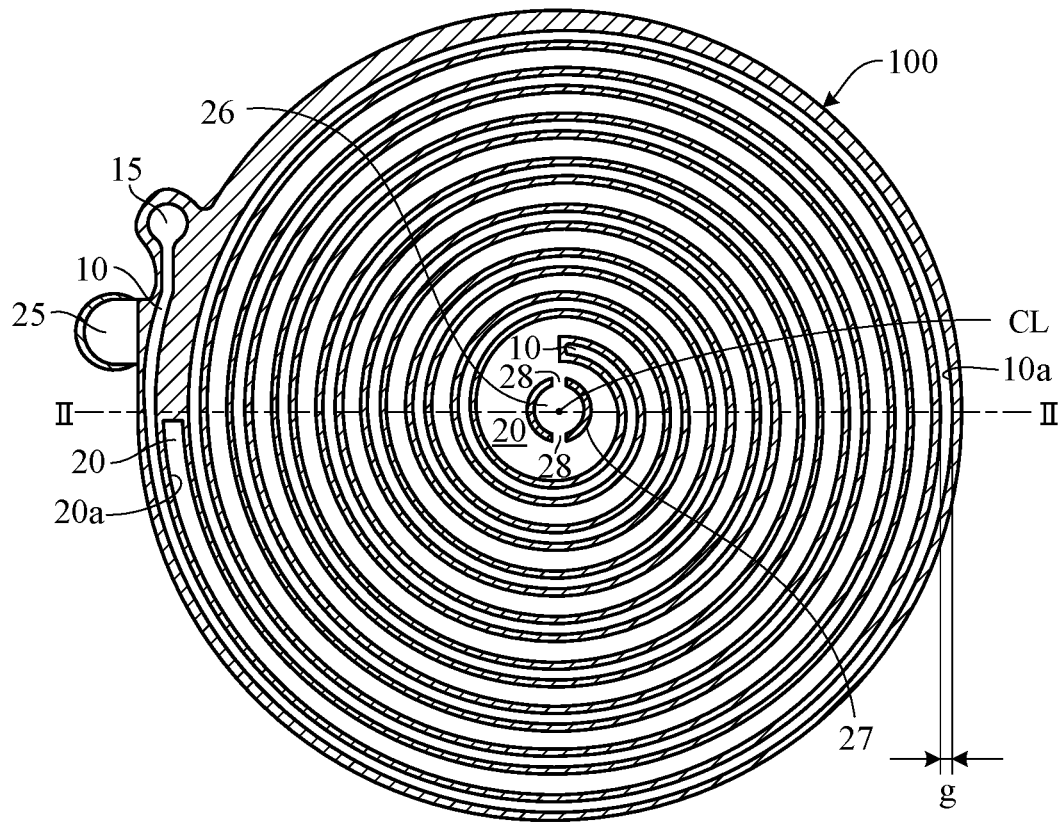
FIG. 3 is a cross-sectional view taken along line III-III of FIG. 2.
Figure 4:
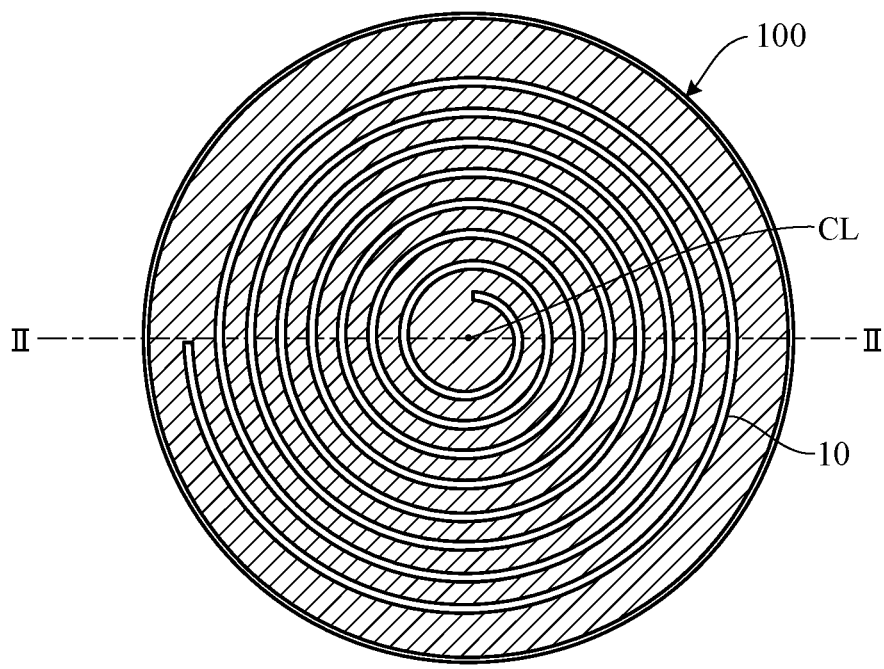
FIG. 4 is a cross-sectional view taken along line IV-IV of FIG. 2.

FIG. 1 is an assembled perspective view illustrating a reactor 100 according to the embodiment of the present invention, which is partially cut out, FIG. 2 is a cross-sectional view taken along line II-II of FIG. 1, FIG. 3 is a cross-sectional view taken along line III-III of FIG. 2, and FIG. 4 is a cross-sectional view taken along line IV-IV of FIG. 2. Hereinafter, a direction radially extending from a vertical axis CL is defined as a radial direction, and a direction along a circumference of a circle centered on the vertical axis CL is defined as a circumferential direction.

The reactor 100 is formed by, for example, an additive manufacturing (AM) method using a metal material such as copper having high thermal conductivity. As illustrated in FIGS. 1 to 4, the reactor 100 has a first flow passage 10 through which fuel and air flow, and a second flow passage 20 which is provided adjacent to the first flow passage 10 and through which a heat medium flows. In a case where the reactor 100 is formed by the additive manufacturing method, the partition wall or the like separating the first flow passage 10 and the second flow passage 20 can be thinned, and the entire reactor 100 can be downsized.

Figure 5:
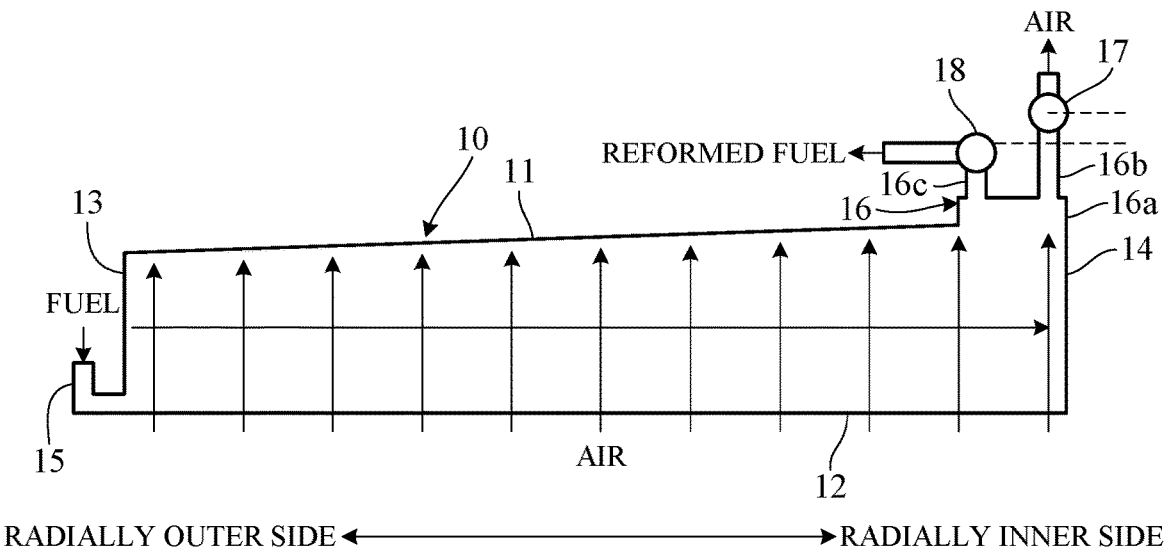
FIG. 5 is a diagram for describing a first flow passage of FIG. 1.
Figure 5:
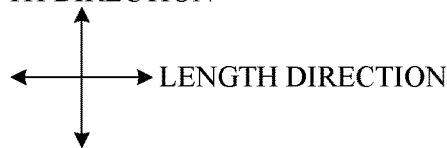
Figure 6:
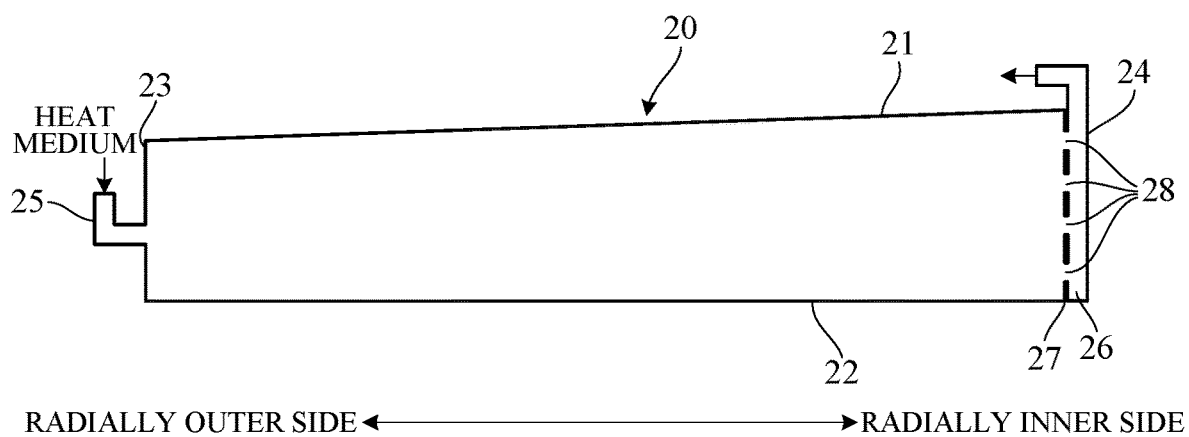
FIG. 6 is a diagram for describing a second flow passage of FIG. 1.
Figure 6:

FIG. 5 is a diagram for describing the first flow passage 10, and FIG. 6 is a diagram for describing the second flow passage 20. As illustrated in FIGS. 1 to 6, each of the first flow passage 10 and the second flow passage 20 is formed in a belt shape so as to extend in a length direction and a width direction, and is formed in a helical shape or a spiral shape around the vertical axis CL (FIGS. 1 to 4) parallel to the width direction.

As illustrated in FIG. 5 and FIG. 6, an upper end surface 11 of the first flow passage 10 and an upper end surface 21 of the second flow passage 20 are inclined so as to increase in height from the radially outer side toward the radially inner side with the vertical axis CL (FIGS. 1 to 4) as the center. That is, the height from a lower end surface 12 to the upper end surface 11 of the first flow passage 10 increases as it is directed from an end surface 13 on a radially outer side to an end surface 14 on a radially inner side, and the height from a lower end surface 22 to the upper end surface 21 of the second flow passage 20 increases from an end surface 23 on a radially outer side toward an end surface 24 on a radially inner side.

As illustrated in FIGS. 1 to 3 and 5, in the first flow passage 10, a first supply passage 15 is provided on the end surface 13 on a radially outer side, and fuel (liquid) is supplied from a fuel tank (not illustrated) via the first supply passage 15. As illustrated in FIGS. 1 to 4, the lower end surface 12 of the first flow passage 10 is opened. As illustrated in FIGS. 1 and 2, the bottom surface of the reactor 100 in which the first flow passage 10 and the second flow passage 20 are formed is closed by a closing plate 30. The closing plate 30 is provided with an opening 31, and air (gas) is supplied from an air pump (not illustrated) to the first flow passage 10 via the opening 31. A check valve is provided in the air supply passage from the air pump to the opening 31, and the outflow of the fuel through the opening 31 is prevented.

As illustrated in FIG. 1, the reactor 100 and the closing plate 30 are fixed by using a fixing ring 60. As illustrated in FIGS. 1 and 2, a guide plate 40 through which air flows along the first flow passage 10 (FIG. 4) and a filter 50 made of a porous material such as a sintered body or a foam, or a fine-pore mesh material and having homogeneous pores are placed between the lower end surface of the reactor 100 and the closing plate 30. The fuel supplied to the first flow passage 10 also fills a space between the reactor 100 including the filter 50 and the closing plate 30.

The air introduced into the space between the reactor 100 and the closing plate 30 through the opening 31 passes through the filter 50 in the process of flowing toward the upper first flow passage 10 along the guide plate 40, become a homogeneous fine bubble shape, and is supplied to the first flow passage 10. As a result, as illustrated in FIG. 5, in the first flow passage 10, the fine bubble-like air (air bubble) is supplied from the lower end surface 12 over the entire region from the end surface 13 on a radially outer side to the end surface 14 on a radially inner side. The air bubble supplied to the first flow passage 10 flows so as to rise along the width direction orthogonal to the length direction in which the fuel flows. The air bubble disappears over time, but since the length of the first flow passage 10 in the width direction is relatively short, for example, the air bubble can be reliably maintained in the range from the lower end surface 12 to the upper end surface 11 even in case where the air bubble 11 is relatively large and the period until the air bubble disappear is short.

Figure 7A:
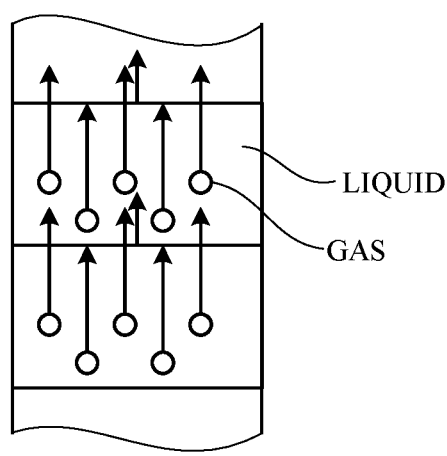
FIG. 7A is a diagram for describing a case where fuel and air flow in the same direction.
Figure 7B:
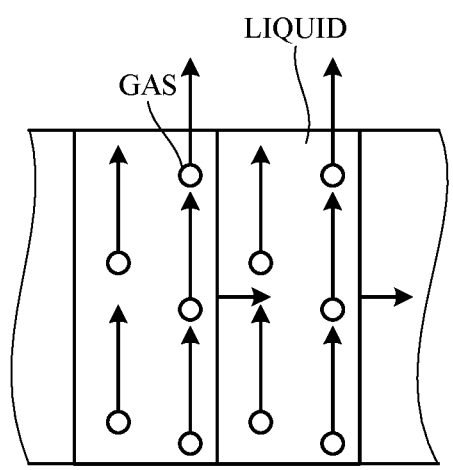
FIG. 7B is a diagram for describing a case where fuel and air flow in directions orthogonal to each other.

FIG. 7A is a diagram for describing a case where fuel (liquid) and air (air bubble) flow in the same direction, and FIG. 7B is a diagram for describing a case where fuel (liquid) and air (air bubble) flow in directions orthogonal to each other. As illustrated in FIG. 7A, even in the flow reactor in which a liquid reactant (fuel) flows at a constant speed, in a case where a liquid and gas (air bubble) flow upward in the vertical direction, the air bubble moves upward faster than the liquid, and thus the liquid is stirred in a flow direction. In this case, the reactor functions as a continuous stirred tank reactor (CSTR).

On the other hand, as illustrated in FIG. 7B, in a case where the liquid flows in a horizontal direction and the gas (air bubble) flows upward in a vertical direction, the liquid reactant (fuel) is not stirred in the flow direction, and the reactor functions as a plug flow reactor (PFR). In the plug flow reactor, the reaction can proceed more efficiently than that in the continuous stirred tank reactor.

Figure 8:
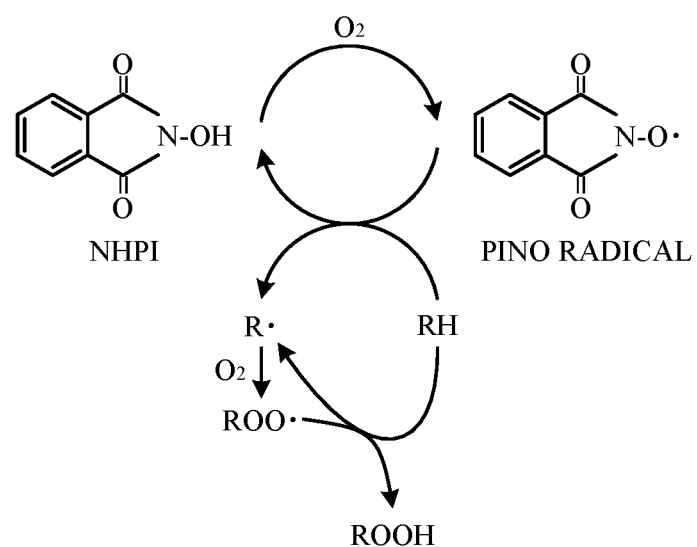
FIG. 8 is a diagram for describing a chemical reaction when a fuel containing hydrocarbon as a main component is oxidatively reformed.

FIG. 8 is a diagram for describing a chemical reaction when a fuel containing hydrocarbon as a main component is oxidatively reformed. As illustrated in FIG. 8, the fuel containing the hydrocarbon as a main component is oxidatively reformed using a catalyst such as N-hydroxyphthalimide (NHPI) to produce a peroxide, such that ignitability thereof can be improved. Specifically, with NHPI, a hydrogen molecule is easily extracted using an oxygen molecule to produce a phthalimide-N-oxyl (PINO) radical. With the PINO radical, a hydrogen molecule is extracted from a hydrocarbon (RH) contained in the fuel to produce an alkyl radical (R.). The alkyl radical is bonded to an oxygen molecule to produce an alkyl peroxy radical (ROO.). With the alkyl peroxy radical, a hydrogen molecule is extracted from a hydrocarbon contained in the fuel to produce an alkyl hydroperoxide (ROOH), which is a peroxide.

The first flow passage 10 functions as a reactor (reaction field) in which the fuel and oxygen in the air react (oxidation reaction, fuel reforming reaction) to generate reformed fuel. A catalyst such as the NHPI catalyst is supported on an inner wall surface 10a of the first flow passage 10 (wall surface support). The fuel supplied to the first flow passage 10 is in contact with the oxygen contained in the air (air bubble) supplied from the lower end surface 12 and the catalyst supported on the inner wall surface 10a over the entire region from the end surface 13 on a radially outer side to the end surface 14 on a radially inner side. Therefore, the oxidation reforming reaction of the fuel is promoted in the entire region from the end surface 13 on a radially outer side to the end surface 14 on a radially inner side in the first flow passage 10.

In a case where the reactor 100 is formed by the additive manufacturing method, unevenness can be easily formed on the inner wall surface 10a of the first flow passage 10, and the surface area of the wall surface on which the reactant and the catalyst are in contact with each other can be increased. The inner wall surface 10a of the first flow passage 10 is plated with a material that does not affect the reforming reaction, such as nickel. The reactor 100 itself may be formed using the material that does not affect the reforming reaction, such as nickel.

Note that instead of a fixed bed type in which the catalyst is supported on the inner wall surface 10a of the first flow passage 10 through which the reactant flows, a fluidized bed type may be used in which a catalyst solution obtained by mixing a catalyst (powder) with an appropriate solvent is supplied to the first flow passage 10 together with the fuel and caused to flow. In this case, the particle size of the catalyst (powder) is reduced, and thus the reaction efficiency can be improved. The NHPI catalyst does not need to be separated from the reformed fuel and can be directly supplied to the engine.

As illustrated in FIG. 3, a gap g between the inner wall surfaces 10a of the first flow passage 10 is twice a quenching distance or less. Therefore, since the inner wall surface 10a of the first flow passage 10 is always present in the range within the quenching distance from the reactant, the safety of the reactor 100 can be enhanced. In a case where the safety is further increased, the reactor 100 may be configured such that the gap g is equal to or less than the maximum safety gap. By configuring the first flow passage 10, which is a reaction field in which the oxidation reaction of the fuel proceeds, with the maximum safety gap, for example, the flame is immediately extinguished even in a case where the flame enters from an adjacent device, and thus the safety of the reactor 100 can be further enhanced.

As illustrated in FIGS. 1, 2, and 5, in the first flow passage 10, a first discharge passage 16 is provided near the end surface 14 on a radially inner side, and the fuel after reforming (reformed fuel) and the air are discharged through the first discharge passage 16. The first discharge passage 16 protrudes upward from the upper end surface 11 near the end surface 14 of the first flow passage 10. By providing the first discharge passage 16 on the upper end surface 11 of the first flow passage 10 near the highest end surface 14 on a radially inner side, it is possible to efficiently discharge the air that has been supplied from the lower end surface 12, reached the upper end surface 11, and then moved to the vicinity of the highest end surface 14 on a radially inner side along the upper end surface 11.

The first discharge passage 16 includes an arcuate passage 16a extending in a circumferential direction around the vertical axis CL, a first branch passage 16b protruding upward from the arcuate passage 16a, and a second branch passage 16c. To the first branch passage 16b, a gas-liquid separation device 17 such as a separator or a condenser is provided at a position higher than the upper end surface of the second branch passage 16c. To the second branch passage 16c, a filter 18 for filtering foreign substances is provided. The air discharged through the first branch passage 16b is supplied to an intake port of the engine and sucked into a combustion chamber of the engine together with fresh air. The reformed fuel discharged through the second branch passage 16c is supplied to an injector of the engine and injected into the combustion chamber of the engine.

As illustrated in FIGS. 1 to 3 and 6, in the second flow passage 20, a second supply passage 25 is provided on the end surface 23 on a radially outer side, and engine cooling water as a heat medium is supplied from the engine (not illustrated) via the second supply passage 25.

As illustrated in FIGS. 1 to 3, the second flow passage 20 is adjacent to the first flow passage 10 via a relatively thin partition wall made of a metal material such as copper having high thermal conductivity. When the heat medium flows through such a second flow passage 20, even with the heat medium having a relatively low temperature such as engine cooling water, the temperature of the first flow passage 10 functioning as the reaction field of the fuel reforming reaction can be efficiently increased to a catalyst activation temperature range, and the fuel reforming reaction can be suitably promoted.

In a case where the reactor 100 is formed by the additive manufacturing method, unevenness can be easily formed on an inner wall surface 20a of the second flow passage 20 (and the inner wall surface 10a of the first flow passage 10), the surface area of the wall surface on which heat exchange is performed can be increased, and heat exchange performance can be improved. The temperature of the first flow passage 10 functioning as the reaction field of the fuel reforming reaction is sufficiently increased, and thus the fuel reforming rate can be improved. Alternatively, the number of catalyst options that can be employed can be increased.

As illustrated in FIGS. 1 to 3 and FIG. 6, in the second flow passage 20, a second discharge passage 26 for discharging the heat medium is provided in the flow passage on a radially inner side. The second discharge passage 26 protrudes upward from the lower end surface 22 of the second flow passage 20 and is formed in a columnar shape centered on the vertical axis CL. The second flow passage 20 and the second discharge passage 26 provided in the second flow passage 20 are separated by a cylindrical partition wall 27.

Figure 9:
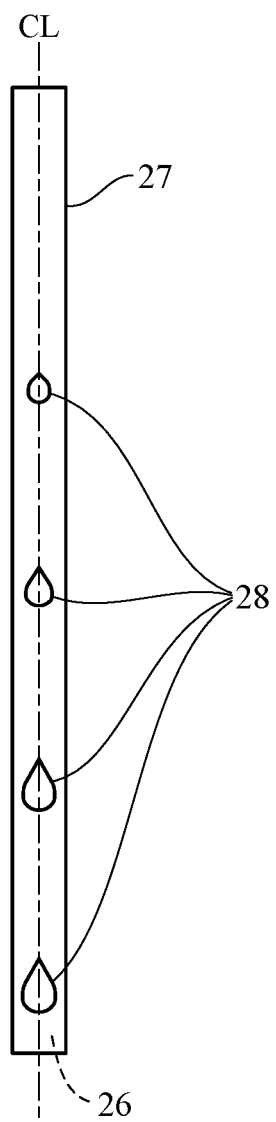
FIG. 9 is a view for describing a second discharge passage of FIG. 1.

FIG. 9 is a view for describing the second discharge passage 26, and a front view of the partition wall 27. As illustrated in FIGS. 1, 6, and 9, the partition wall 27 is provided with a plurality of (four in the illustrated example) communication holes 28 having different heights from the lower end surface 22 of the second flow passage 20, and the heat medium is discharged from the second flow passage 20 via the communication holes 28 and the second discharge passage 26. The engine cooling water as the heat medium discharged through the second discharge passage 26 is returned to the engine. The partition wall 27 is formed such that a plurality of the communication holes 28 increase in size toward the lower side and decrease in size toward the upper side. Therefore, since the flow of the heat medium in the second flow passage 20 becomes greater as it is directed toward the lower side, the heat exchange at the lower side of the reactor 100 is promoted, and the heat exchange can be performed in a balanced manner in the entire vertical direction of the reactor 100. Note that a plurality of the communication holes 28 are provided at a plurality of locations (two locations in the example of FIG. 3) in the circumferential direction.

By configuring the reactor 100 as illustrated in FIGS. 1 to 9, it is possible to efficiently increase the volume of the first flow passage 10 as a reaction field while ensuring the safety of the reactor 100. Furthermore, as illustrated in FIGS. 5 and 7B, by causing the fuel to flow in the horizontal direction and causing the air (air bubble) to flow upward in the vertical direction, the air (air bubble) containing oxygen as a reactant is efficiently supplied over the entire region of the first flow passage 10, and the entire region of the first flow passage 10 can be effectively used as a reaction field. Furthermore, since the fuel, which is a reactant of the liquid, is not stirred in the flow direction, the contact reforming reaction can proceed more efficiently than that in a case where the fuel and the air flow in the same direction (FIG. 7A). Furthermore, the belt-like first flow passage 10 as a reaction field is sandwiched by the belt-shaped second flow passages 20 through which the heat medium flows, and the temperature is efficiently increased over the entire region. Therefore, the contact reforming reaction can proceed efficiently even in a case where relatively low-temperature engine cooling water is used as the heat medium.

Figure 10A:
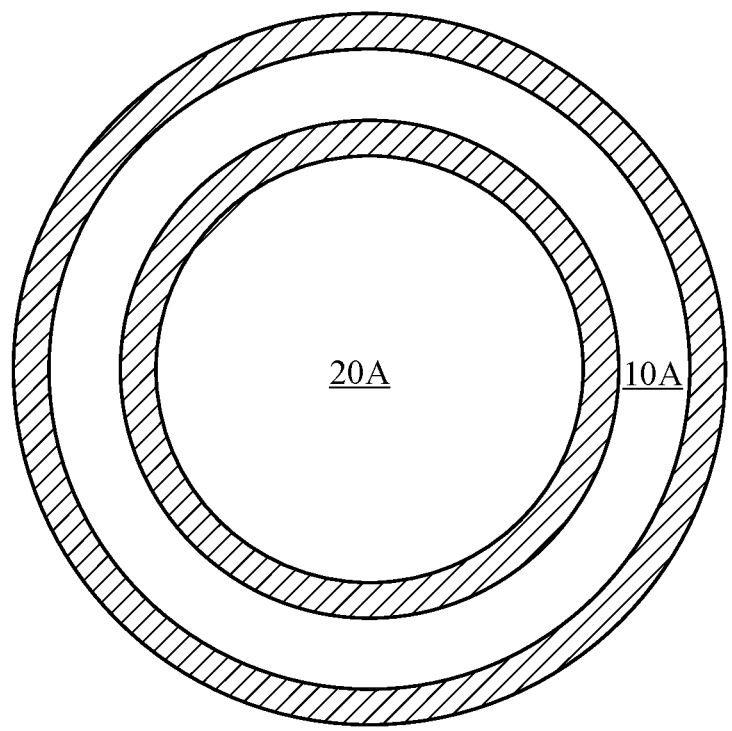
FIG. 10A is a cross-sectional view of a double-pipe reactor.
Figure 10B:
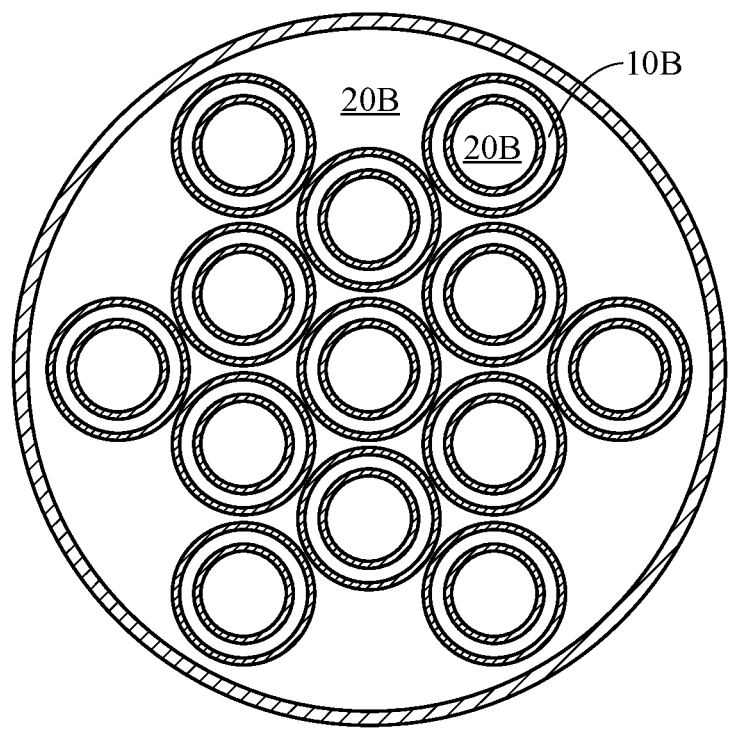
FIG. 10B is a cross-sectional view of a double-pipe set reactor.
Figure 10C:
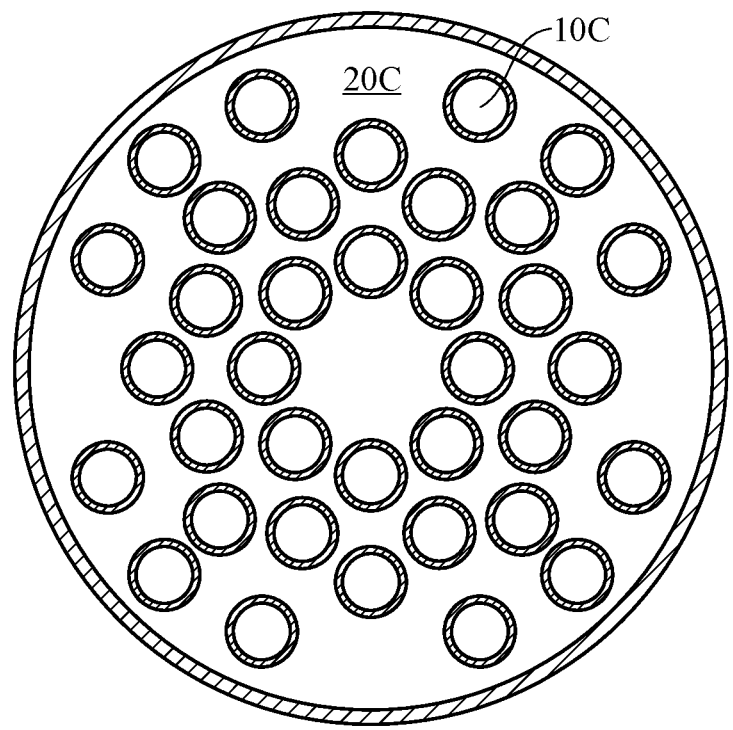
FIG. 10C is a cross-sectional view of a pipe-set reactor.
Figure 10D:
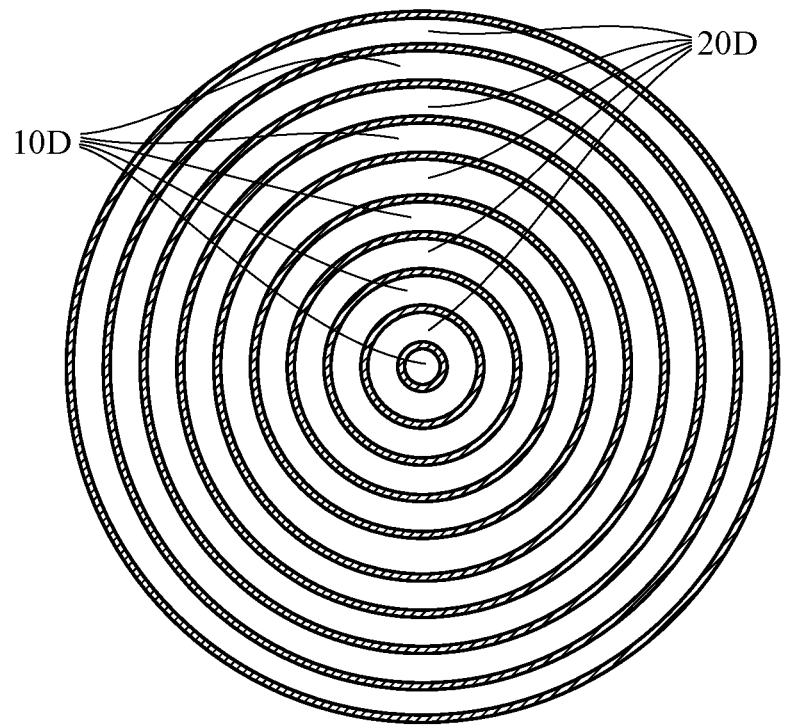
FIG. 10D is a cross-sectional view of a multi-pipe reactor.

FIGS. 10A to 10D are diagrams for describing a comparative example of the present invention. FIG. 10A is a cross-sectional view of the double-pipe reactor, FIG. 10B is a cross-sectional view of a double-pipe set reactor, FIG. 10C is a cross-sectional view of a pipe-set reactor, and FIG. 10D is a cross-sectional view of a multi-pipe reactor.

As illustrated in FIG. 10A, the double-pipe reactor is configured of an outer pipe member and an inner pipe member, which are provided coaxially. In the double-pipe reactor, a reactant (for example, an air-fuel mixture) flows through a first flow passage 10A between the outer pipe member and the inner pipe member, and a heat medium flows through a second flow passage 20A on an inner peripheral side of the inner pipe member.

As illustrated in FIG. 10B, the double-pipe set reactor is configured as an assembly of double-pipe reactors as illustrated in FIG. 10A. In the double-pipe set reactor, the reactant flows through a first flow passage 10B between the outer pipe member and the inner pipe member of each double-pipe reactor, and the heat medium flows through a second flow passage 20B on the inner peripheral side of the inner pipe member of each double-pipe reactor and on the outer peripheral side of the outer pipe member of each double-pipe reactor.

As illustrated in FIG. 10C, the pipe-set reactor is configured as an assembly of single pipe members. In the pipe-set reactor, the reactant flows through a first flow passage 10C on the inner peripheral side of each single pipe member, and the heat medium flows through a second flow passage 20C on the outer peripheral side of each single pipe member.

As illustrated in FIG. 10D, the multi-pipe reactor is configured of a plurality of pipe members provided coaxially and having different diameters from each other. In the multi-pipe reactor, a plurality of flow passages are configured using each pipe member as a partition wall. A plurality of the flow passages are radially alternately assigned as a first flow passage 10D through which the reactant flows and a second flow passage 20D through which the heat medium flows.

FIG. 11 is a diagram for describing a comparison result of the structure of the reactor, and describes a case where the volume of the reaction field (first flow passages 10, 10B to 10D) is scaled up by about 10 times based on the double-pipe reactor of FIG. 10A. As illustrated in FIG. 11, in a case where the reactor is configured to have a helical shape or a spiral shape, the length (height) of the reactor can be made shorter than those of the double-pipe set reactor and the pipe-set reactor. Furthermore, the cross-sectional area of the reactor can be made smaller than those of the double-pipe set reactor, the pipe-set reactor, and the multi-pipe reactor. Therefore, the volume (size) of the reactor can be made smaller than those of the double-pipe set reactor and the pipe-set reactor. Furthermore, the first flow passage 10 (length of the fuel flow passage), which is the reaction field, can be made longer than those in the double-pipe set reactor, the pipe-set reactor, and the multi-pipe reactor.

As described above, since the first flow passage 10, which is the reaction field, can be lengthened by configuring the reactor in a helical shape or a spiral shape, the reforming reaction can proceed efficiently by lengthening the period during which the heat exchange and the reforming reaction are performed. Furthermore, since the entire reactor 100 can be downsized, mountability to a vehicle can be improved.

According to the present embodiment, the following functions and effects can be achieved.

(1) A reactor 100 includes a first flow passage 10 through which fuel (liquid) and air (gas) containing oxygen that reacts with the fuel flow, and a second flow passage 20 provided adjacent to the first flow passage 10 and through which a heat medium flows (FIGS. 1 to 3). Each of the first flow passage 10 and the second flow passage 20 is formed in a belt shape so as to extend in a length direction and a width direction, and is formed in a helical shape or a spiral shape around a vertical axis CL parallel to the width direction (FIGS. 1 to 3, FIG. 5, and FIG. 6). The fuel is supplied to the first flow passage 10 so as to flow in the length direction, and the air (air bubble) is supplied so as to flow in the width direction. As described above, by making the reactor 100 helical or spiral, the volume of the reaction field can be efficiently increased. Furthermore, by causing the fuel to flow in the horizontal direction and causing the air (bubble) to flow upward in the vertical direction (FIG. 7B), the contact reaction can proceed more efficiently than a case of causing the fuel and the air to flow in the same direction (FIG. 7A).

(2) In the first flow passage 10, a first supply passage 15 for supplying a liquid is provided on a radially outer side about the vertical axis CL, and a first discharge passage 16 for discharging a liquid and gas is provided on a radially inner side about the vertical axis CL (FIGS. 1 to 3 and FIG. 5). In the second flow passage 20, a second supply passage 25 for supplying a heat medium is provided on the radially outer side and a second discharge passage 26 for discharging the heat medium is provided on a radially inner side (FIGS. 1 to 3 and FIG. 6). An upper end surface 11 of the first flow passage 10 and an upper end surface 21 of the second flow passage 20 are inclined so as to increase in height from a radially outer side to a radially inner side (FIGS. 1, 2, 5, and 6). Therefore, the air in the first discharge passage 16 can be efficiently discharged.

(3) The first discharge passage 16 includes an arcuate passage 16a protruding upward from the upper end surface 11 on a radially inner side of the first flow passage 10 and extending in the circumferential direction about the vertical axis CL, and a plurality of branch passages 16b and 16c protruding upward from the arcuate passage 16a (FIGS. 1, 2, and 5). By providing the arcuate passage 16a as described above, it is possible to structurally easily connect the first flow passage 10 near the vertical axis CL and a plurality of the branch passages 16b and 16c.

(4) The plurality of the branch passages 16b and 16c include a first branch passage 16b and a second branch passage 16c. In the first branch passage 16b, a gas-liquid separation device 17 is provided at a position higher than an upper end surface of the second branch passage 16c (FIG. 5). Therefore, the reformed fuel can be reliably collected with a simple configuration.

(5) The second discharge passage 26 protrudes upward from a lower end surface 22 of the second flow passage 20 and is formed in a columnar shape centered on the vertical axis CL (FIGS. 1 to 3, and FIG. 9). The reactor 100 further includes a cylindrical partition wall 27 that separates the second flow passage 20 and the second discharge passage 26 (FIGS. 1 to 3 and 9). The partition wall 27 is provided with a plurality of communication holes 28 having different heights from the lower end surface 22 of the second flow passage 20 (FIGS. 1, 6, and 9). The plurality of the communication holes 28 increase in size toward the lower side and decrease in size toward the upper side. Therefore, since the flow of the heat medium in the second flow passage 20 becomes greater as it is directed toward the lower side, the heat exchange at the lower side of the reactor 100 is promoted, and the heat exchange can be performed in a balanced manner in the entire vertical direction of the reactor 100.

In the above-described embodiment, the reactor 100 that reforms the fuel by the oxidation reaction has been described as an example, but the reactor may be only required to cause the reaction by causing the liquid and the gas to flow, and is not limited to the exemplified reactor. For example, the present invention may be applied to a chemical reaction other than an oxidation reaction of a liquid other than the fuel or an oxidation reaction of gas other than the oxygen, or may be applied to a chemical reaction other than the contact (catalyst) reaction. In this case, the presence or absence of the catalyst applied to the first flow passage, the type of catalyst, the plating treatment of the inner wall surface of the first flow passage, and the like are appropriately selected according to the type of chemical reaction to which the reactor is applied.

In the above-described embodiment, the helical or spiral reactor 100 is configured by disposing the first flow passage 10 on the radially outer side and the second flow passage 20 on the radially inner side, but the first flow passage and the second flow passage are only required to be provided adjacent to each other, and the helical or spiral reactor may be configured by disposing the first flow passage on the radially inner side and the second flow passage on the radially outer side. Furthermore, in the above-described embodiment, the helical or spiral reactor 100 is configured such that the reactant and the heat medium flow through the first flow passage 10 and the second flow passage 20 from the radially outer side to the radially inner side. However, it may be configured such that the reactant and the heat medium may flow from the radially inner side to the radially outer side.

The above embodiment can be combined as desired with one or more of the aforesaid modifications. The modifications can also be combined with one another.

According to the present invention, it becomes possible to efficiently increase the volume of the reaction field.

Above, while the present invention has been described with reference to the preferred embodiments thereof, it will be understood, by those skilled in the art, that various changes and modifications may be made thereto without departing from the scope of the appended claims.

The invention claimed is:

1. A reactor, comprising:
a first flow passage through which liquid and gas that reacts with the liquid flow; and
a second flow passage provided adjacent to the first flow passage and through which a heat medium flows, wherein
each of the first flow passage and the second flow passage is formed in a belt shape so as to extend in a length direction and a width direction orthogonal to the length direction, and is formed in a helical shape or a spiral shape around a vertical axis parallel to the width direction, wherein
the liquid is supplied to the first flow passage so as to flow in the length direction, wherein
the gas is supplied to the first flow passage so as to flow in the width direction.

2. The reactor according to claim 1, wherein
the first flow passage includes:
a first supply passage provided on a radially outer side about the vertical axis and supplying the liquid into the first flow passage; and
a first discharge passage provided on a radially inner side about the vertical axis and discharging the liquid and the gas from the first flow passage,
wherein
the second flow passage includes:
a second supply passage provided on the radially outer side and supplying the heat medium into the second flow passage; and
a second discharge passage provided on the radially inner side and discharging the heat medium from the second flow passage, wherein
an upper end surface of the first flow passage and an upper end surface of the second flow passage are inclined so as to increase in height from the radially outer side to the radially inner side.

3. The reactor according to claim 2, wherein
the first discharge passage includes:
an arcuate passage protruding upward from the upper end surface on the radially inner side of the first flow passage and extending in a circumferential direction about the vertical axis; and
a plurality of branch passages protruding upward from the arcuate passage.

4. The reactor according to claim 3, wherein
the plurality of branch passages includes a first branch passage and a second branch passage, wherein
the first branch passage includes a gas-liquid separation device provided at a position higher than an upper end surface of the second branch passage.

5. The reactor according to claim 2, wherein
the second discharge passage protrudes upward from a lower end surface of the second flow passage and is formed in a columnar shape centered on the vertical axis, wherein
the reactor further comprises:
a cylindrical partition wall that separates the second flow passage and the second discharge passage, wherein
the partition wall is provided with a plurality of communication holes having different heights from the lower end surface of the second flow passage, wherein
the plurality of communication holes increase in size toward lower side and decrease in size toward upper side.

6. The reactor according to claim 1, wherein
a gap between inner wall surfaces of the first flow passage is twice a quenching distance or less or a maximum safety gap or less.

7. The reactor according to claim 1, further comprising:
a filter having fine pores, wherein the gas is provided into the first flow passage through the filter from lower side.

* * * * *